United States Patent

Girault et al.

[11] Patent Number: 5,921,106
[45] Date of Patent: Jul. 13, 1999

[54] PROCESS FOR COMPRESSING A GAS ASSOCIATED WITH A UNIT FOR SEPARATING A GAS MIXTURE

[75] Inventors: Jean-Louis Girault, Liege, Belgium; Corinne Garot, Ormesson-sur-Marne; Philippe Fraysse, Fontenay-Aux-Roses, both of France

[73] Assignee: L'Air Liquide, Societe Anonyme Pour L'Etude et L'Exploitation des Procedes Georges Claude, Paris Cedex, France

[21] Appl. No.: 08/928,397

[22] Filed: Sep. 12, 1997

[30] Foreign Application Priority Data

Sep. 13, 1996 [FR] France ................................ 96 11216

[51] Int. Cl.⁶ .......................................................... F25J 1/00

[52] U.S. Cl. ................................................. 62/619; 62/613

[58] Field of Search ........................................ 62/619, 613

[56] References Cited

U.S. PATENT DOCUMENTS

| 4,874,413 | 10/1989 | Thonnelier | 62/640 |
| 5,386,692 | 2/1995 | Laforce | 62/646 |
| 5,511,381 | 4/1996 | Higginbotham | 62/646 |

FOREIGN PATENT DOCUMENTS

| 0 069 454 | 1/1983 | European Pat. Off. . |
| 0 532 429 | 3/1993 | European Pat. Off. . |
| 0 654 643 | 5/1995 | European Pat. Off. . |
| 0 718 576 | 6/1996 | European Pat. Off. . |

*Primary Examiner*—Ronald Capossela
*Attorney, Agent, or Firm*—Young & Thompson

[57] ABSTRACT

In a process for compressing a gas, associated with a unit (5) for separating a gas mixture, the compressor (1, 2, 7) comprises a number of stages less than that which would be necessary to produce an optimal compressor of the isothermal type compressing the same flow rate of the gas to the same pressure. The compressor may compress the gas mixture to be separated or a product of the separation.

15 Claims, 2 Drawing Sheets cooling water circuit

PROCESS FOR COMPRESSING A GAS ASSOCIATED WITH A UNIT FOR SEPARATING A GAS MIXTURE

FIELD OF THE INVENTION

The present invention relates to a process for compressing a gas associated with a unit for separating a gas mixture, and an apparatus intended for implementing the process. It more particularly relates to a process for compressing air separated in a distillation column.

BACKGROUND OF THE INVENTION

In distillation processes, it is common practice to compress the gas mixture and then purify it in a purification system (for example an adsorption system) which needs to be regenerated after it has operated for some time, by passing through it a gas which is heated to the regeneration temperature. In the case of air, the adsorbent bottles which constitute the adsorption system are generally heated by a residual gas for about one third of the cycle time.

This regeneration is expensive in terms of energy. For example, for a 200 t/day air separation plant processing 30,000 m$^3$(s.t.p.)/h of air, a residual gas heater consumes 300 kW, i.e. an average of 100 kW.

One of the objects of this invention is to eliminate the independent heater, another object being to integrate the compression and regeneration systems in order to reduce the energy costs of the plant.

SUMMARY OF THE INVENTION

According to the present invention, there is provided a process for compressing a gas associated with a unit for separating a gas mixture, in which a flow of the gas is compressed in a compressor to the pressure required by the process, characterized in that the number of stages of the said compressor is less, typically by 1, than that which would be necessary to produce an optimal compressor of the isothermal type compressing the same flow rate of the said gas to the same pressure.

According to particular embodiments, provision is made that
  the gas compressed in the compressor is the gas mixture intended for the separation unit or originates from the separation unit.
  the compressed gas mixture output by the compressor is air which is cooled then sent to a unit (B1) for purification by adsorption with respect to water and CO$_2$.

According to the invention, an apparatus is also provided for compressing a gas associated with a unit for separating a gas mixture, comprising
  a compressor capable of bringing the gas to a required pressure,
  a unit for separating the gas mixture,
  means for sending a gas to the compressor, characterized in that the number of stages of the compressor is less, typically by 1, than that which would be necessary to produce an optimal compressor of the isothermal type compressing the same flow rate of the said gas to the same pressure.

According to particular embodiments, the following are provided:
  means for sending the gas mixture intended for the separation unit to the compressor, and means for sending the compressed gas mixture to the separation unit,
  means for sending a gas originating from the separation unit to the compressor,
  a means for cooling the compressed gas downstream of the compressor,
  means for sending at least a part of the compressed gas mixture to an absorption-type refrigerating unit.

The invention thus applies to processes for compressing a gas originating from a separation unit, for example a nitrogen flow originating from an air separation unit.

In air separation apparatus which process more than 10,000 m$^3$(s.t.p.)/h of air and in which the air is compressed to the operating pressure of the MP column (that is to say about 5 bar), use is generally made of an air compressor of the centrifugal type having 3 or 4 compression stages. Since the heating in each compression stage is reduced ($\Delta T \cong 60°$ C. for each compression stage) with a compression ratio of 1.7, the energy which these compressors expend is close to the optimum in terms of industrial economics. The example in FIG. 1 shows a compressor having three compression stages 1, 2, 3, each compression stage being cooled by a cooling water circuit 4. The compressed air is cooled on leaving the last wheel 3 by the water circuit and is then purified with respect to water and carbon dioxide in the adsorbent bed B1.

BRIEF DESCRIPTION OF THE DRAWINGS

An illustrative embodiment of the invention will now be described with reference the appended drawings, in which:

In order to produce the same air flow rate at the same pressure as in FIG. 1, the compressor in FIG. 2 comprises only two compression stages (1, 2), each having a higher compression ratio than the compression stages of the prior art and therefore a greater amount of heating. Thus, the air leaving the compressor is at about 140° C., corresponding to a compression ratio per stage of the order of 2.3. This temperature is sufficient to bring the impure nitrogen 6 from the separation unit to the regeneration temperature of the adsorbent bed B2. In FIG. 2, the heat exchange between the air and the nitrogen takes place by means of a heat-exchange fluid 4 (in this case, pressurized water) which transfers the heat from the air to the impure nitrogen.

The air is thus cooled by the heat-exchange fluid circuit 4 and by a refrigerator 8, it being possible for a variable flow rate of the air to be sent to the heat-exchange fluid circuit. In this way the impure nitrogen 6 is heated to 120° C.

Supplemental refrigeration of the air is often necessary in order to cool the compressed air to its purification temperature ($\cong 10°$ C.). In this case, a refrigerating unit of the mechanical type is used to provide this additional refrigeration.

Figure 3:
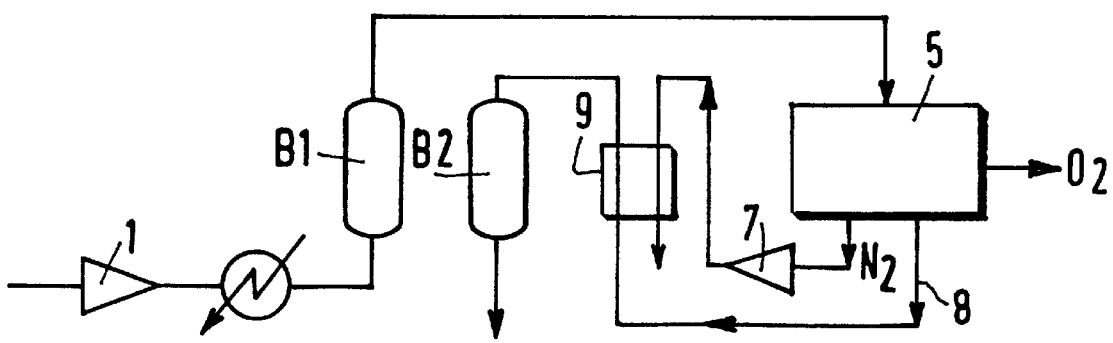

In the case when the said compressor is a nitrogen compressor 7, it can be seen in FIG. 3 that an air flow is sent to an air separation unit 5 which produces oxygen gas, pure nitrogen gas and impure nitrogen gas. At its compression output, the nitrogen gas, which is at a temperature of about 160° C., enters an exchanger 9 where it heats the impure nitrogen 8 to 120° C.

Figure 4:
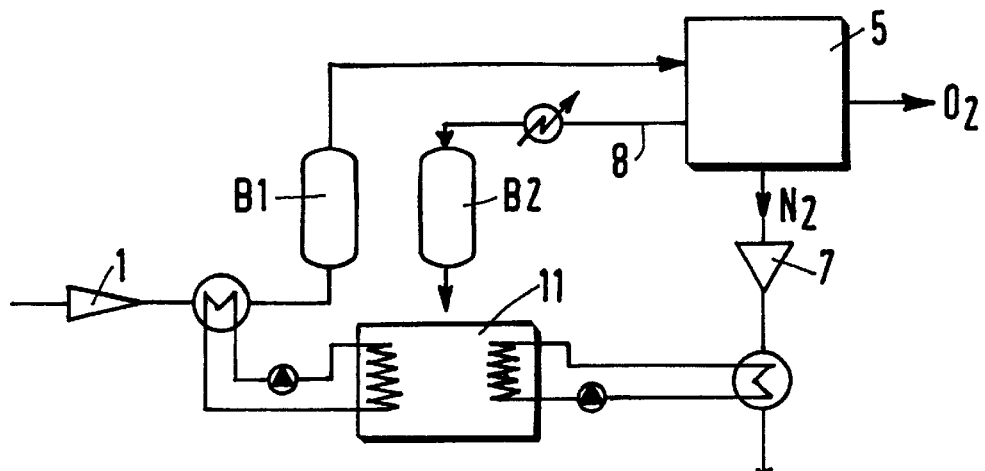

In a variant of the process in FIG. 3, it can be seen in FIG. 4 that the pure nitrogen gas is compressed in the compressor 7 and then transfers heat to an absorption-type refrigerating unit 11 which cools the compressed air to its adsorption-purification temperature.

The teaching disclosed in FIGS. 3 and 4 may be combined to use the heat of compression of the nitrogen compressed in the compressor 7, on the one hand, as a heat source for an absorption-type refrigerating unit 11 (first temperature level), and on the other hand to transfer the heat not used beforehand to the impure nitrogen used for regeneration (second temperature level).

Figure 1:
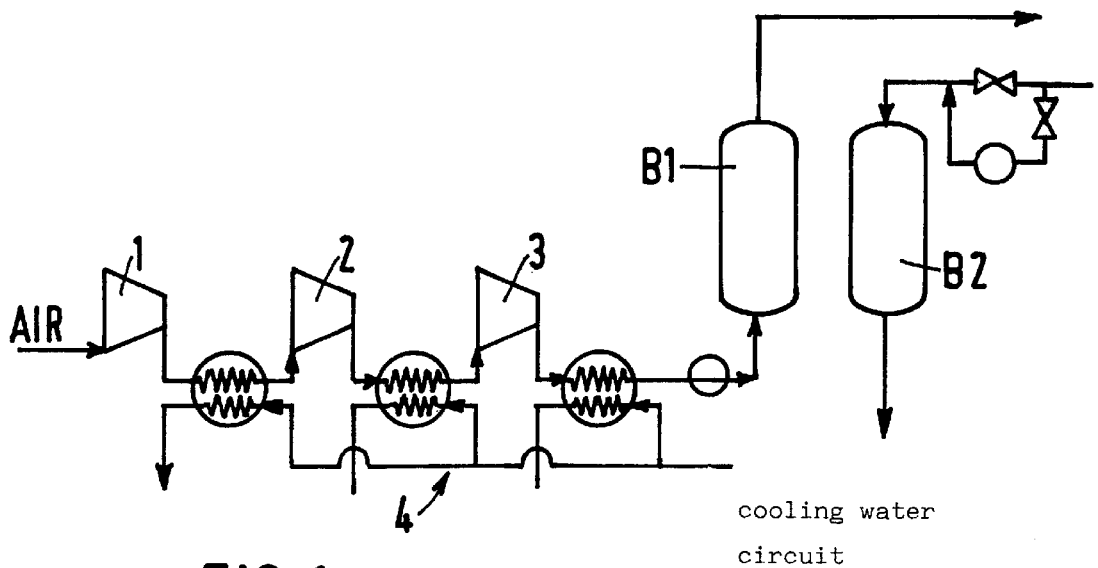
FIG. 1 schematically depicts a conventional process.
Figure 2:
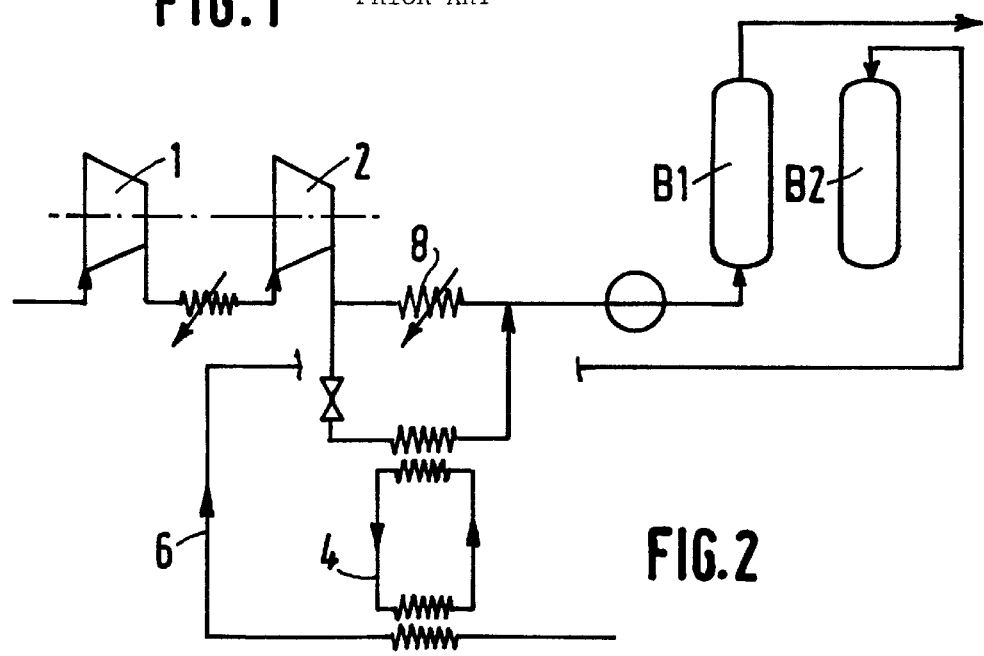
FIGS. 2 to 6 schematically represent processes according to the invention for feeding a separation unit.
Figure 5:
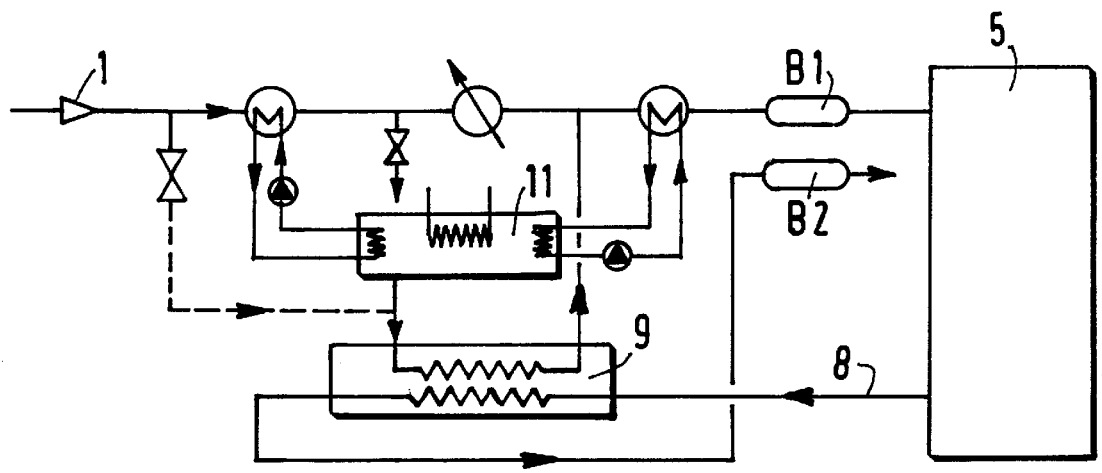

The invention may apply in the same way to the compressed air in FIG. 2. FIG. 5 shows a combined use of the invention, with association of the cooling of the compressed air before its purification by heat transfer with an absorption-type refrigerating unit 11 and with the impure nitrogen 8 used for regeneration by the exchanger 9.

Figure 6:
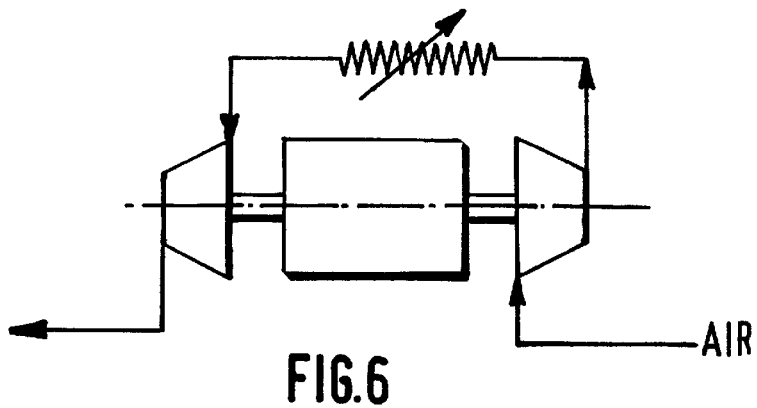

The invention also applies (FIG. 6) to a compressor using a high-speed electric motor which, at the ends of shafts, drives the two compression stages which are adopted. This type of compressor, with unit gearing ratio, is more compact, simpler and therefore easier to install.

The invention applies also to separation units other than distillation-type separation units, and to distillation-type separation units other than those which distil air.

We claim:

1. Process for separating air by cryogenic distillation, comprising:
    compressing feed air in a compressor to obtain compressed air;
    purifying the compressed air in a purification unit by adsorption to obtain purified compressed air;
    cooling the purified compressed air and separating it in a distillation apparatus;
    removing a gas stream from the distillation apparatus;
    warming the gas temperature to a regeneration temperature using compressed feed air having a temperature of at least 100° C. prior to the purification step; and
    using the warmed gas stream at the regeneration temperature to regenerate the purification unit.

2. Process according to claim 1, wherein the purified compressed air is cooled by indirect heat exchange with a fluid which originates from the distillation unit and is subsequently used to regenerate the purification unit.

3. Process according to claim 1, wherein the purified compressed gas is cooled by direct heat exchange with a refrigerant in a closed circuit.

4. Process according to claim 1, wherein the compressed air is used as a heat source for an adsorption-type refrigerating unit producing a cold fluid, said cold fluid being used to cool the purified compressed air to a lower temperature level.

5. Process according to claim 1, wherein the pressure at the compressor outlet is at least 4 bar.

6. Process according to claim 1, wherein the compressor comprises at least two compression stages.

7. Apparatus for separating air by cryogenic distillation, comprising:
    a compressor;
    a purification unit;
    at least one distillation column;
    means for sending air from the compressor to the purification unit, and from the purification unit to the distillation column;
    means for removing a gas from the distillation column, and sending the gas to the purification unit to regenerate the purification unit; and
    means permitting heat exchange between air upstream of the purification unit and the gas from the distillation column prior to sending said gas to regenerate the purification unit, there being no cooling means between the compressor and the means permitting heat exchange.

8. Apparatus according to claim 7, further comprising means for cooling the compressed gas downstream of the compressor.

9. Apparatus according to claim 8, wherein said cooling means is structured and arranged to allow indirect heat exchange with a fluid originating from the distillation column, or direct heat exchange with a refrigerant in a closed circuit.

10. Apparatus according to claim 7, further comprising means for sending at least a part of the compressed gas to an adsorption-type refrigerating unit.

11. Apparatus according to claim 7, wherein the compressor comprises two compression stages, each compression stage being driven at the ends of a shaft by an electric motor with unit gearing ratio.

12. Process for separating an air gas, comprising:
    purifying the air gas in a purification unit to obtain a purified air gas;
    sending the purified air gas to a separation apparatus;
    withdrawing a first gas from the separation apparatus;
    compressing the withdrawn first gas;
    sending a second gas originating from the separation apparatus to the purification unit in order to regenerate said purification unit; and
    using the first compressed gas to heat the second gas before the second gas is sent to the purification unit.

13. Plant for separating an air gas, comprising a system of distillation columns, means for drawing a first gas from a column of the system and means for compressing said first gas; means for drawing a second gas from a column of the system; and a heat exchange means structured and arranged to allow heat exchange between the first compressed gas and the second gas, and, downstream of the heat exchange means, means for sending the second gas to a purification unit.

14. In a process for separating air in which air is compressed, purified and sent to a separation apparatus, a gas is drawn from the separation apparatus and compressed, the improvement wherein heat from the compressed gas is transferred to an absorption-type refrigerating unit which cools the compressed air to its purification temperature.

15. Plant for separating air comprising an air compressor, an air purification unit and a distillation unit;
    means for sending air from the compressor to the air purification unit, and from the purification unit to the distillation unit;
    means for compressing a gas from the distillation unit; and
    means for forwarding the compressed gas to an absorption-type refrigerating unit to which heat is transferred from said compressed gas and which serves to cool the air to its purification temperature.

* * * * *